April 15, 1924.
R. H. STEIN
METHOD OF MAKING THERMOCOUPLE ELEMENTS
Filed Feb. 27, 1922
1,490,438
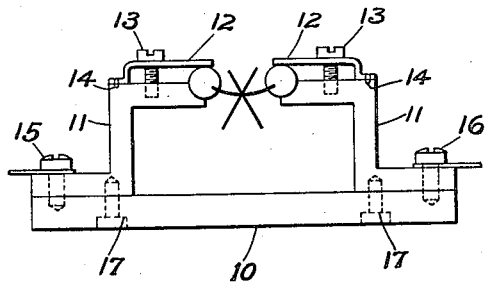
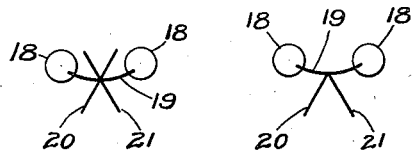
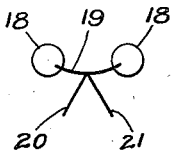
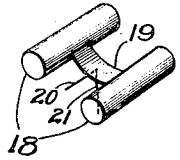
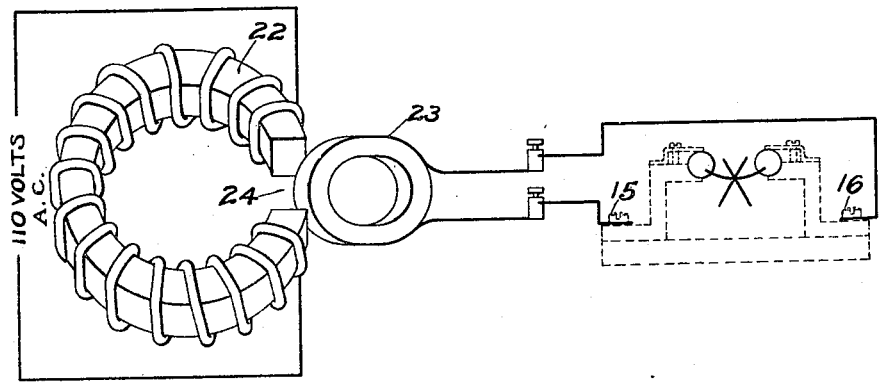
Inventor
Rudolph H. Stein
By
Attorney Patented Apr. 15, 1924.

1,490,438

UNITED STATES PATENT OFFICE.

RUDOLPH H. STEIN, OF WOODHAVEN, NEW YORK.

METHOD OF MAKING THERMOCOUPLE ELEMENTS.

Application filed February 27, 1922. Serial No. 539,744.

*To all whom it may concern:*

Be it known that I, RUDOLPH H. STEIN, a citizen of the United States of America, residing at Woodhaven, county of Queens, Long Island, State of New York, have invented certain new and useful Improvements in Methods of Making Thermocouple Elements, of which the following is a specification.

My invention relates generally to thermocouple elements and more specifically to the method of constructing them.

An object of the invention is the employment of electric soldering in a useful way.

With these and other objects in view, the invention consists in the construction, combination, and arrangement of parts as will be hereinafter described.

Reference is to be had to the accompanying drawings forming part of this specification, in which like reference characters indicate corresponding parts throughout the several views, and in which—

Figure 1 is a view showing the method of holding the thermo-couple element during the process of soldering.

Fig. 2 is an element in the initial stage of completion.

Fig. 3 is an element in a following stage of completion,

Fig. 4 is a preferred arrangement of the electric soldering circuit, and

Fig. 5 is a perspective view of a complete element.

In Figure 1 of the drawings, I have shown a holding device or jig comprising an insulated base 10 and upright arms 11, which taken in connection with clamping members 12 form jaws between which a thermo-couple element or other device is held while being soldered. The clamping members 12 are fastened to the arms 11 by screws 13, and have on their lower faces adjacent one end projections which engage in recesses 14 in the upper faces of the arm to prevent accidental displacement of the arms. The electric circuit, shown in Fig. 4, for soldering is connected to binding posts 15 and 16, these also serving as a means for securing the arms 11 to the base 10. I also show screws 17 as an additional means for fastening these two parts together, but it is to be understood that any simple and efficient method may be employed for this purpose.

A thermo-couple element, Fig. 5, comprises terminals 18, heater strip 19, cathode 20, and anode 21. The heater strip is secured in any desirable manner to the terminals 18 and the two electrodes secured to it as will be later more fully explained.

In the manufacture of my element, I first connect the heater strip with the terminals and then pierce a hole therethrough large enough to allow passage of the two electrodes of the couple as shown in Fig. 2. The element is then placed in the jig and the terminals securely held therein by the clamping members 12 after which a very small amount of dissolved borax and silver solder, or other suitable flux and solder, is applied at the junction of the crossed electrodes where they pass through the opening and a current of sufficient value to cause enough heat to fuse the solder is applied. The current is allowed to pass through the heating element at a volume to fuse the solder for an instant only, and discontinued as soon as the solder flows in order to prevent it from spreading over the heater strip. Care must be exercised to use no more solder than is needed to make a good joint, as an excess impairs the efficiency of the element, making it sluggish in responding to current impulses. After the electrodes are sufficiently soldered, they are clipped off as shown in Fig. 3.

A small current transformer, made of an arc light reactance coil 22 and a coil 23, the latter having preferably 30 turns, as shown in Fig. 4, is used to control the current to the heating element. Adjustment of the coil 23 into and out of the slot 24 in the core of the reactance may be made through any suitable arrangement. As I do not desire to claim any particular method of adjustment, none has been illustrated, although I have found that a screw is preferable. This affords a much better means of current control than a rheostat as the adjustment of the coil may be made uniform and certain, and small increments of current may be readily obtained.

It is to be understood that while this invention has been described applying particularly to a thermo-couple element, and especially those to be used in connection with radio instruments, it may be equally as well successfully employed in connection with electrical devices of any type requiring thermo-couples, or other similarly constructed devices. It will be further understood that the above description taken in connection with the accompanying drawings form only the preferred and general embodiment of my invention and that various minor changes in construction, proportion, and arrangement of parts may be made without departing from the scope of the appended claims, and without sacrificing any of the advantages of my invention.

Having fully described my invention, what I desire to secure by Letters Patent is:—

1. The process of manufacture of thermocouple elements which consists of soldering to a heating element the point of junction of thermo-electric dissimilar materials by employing the heat produced in passing an electric current through said heating element to melt the solder.

2. The process of manufacture of thermocouple elements which consists of soldering a pair of thermo-electric dissimilar materials at their junction point to a heating element by employing the heat of an electric current passed through said heating element to melt the solder, and controlling said current to regulate the amount of solder so melted.

3. The process of manufacture of thermocouple elements which consists of piercing a heating element, passing a plurality of thermo-couple electrodes therethrough, applying solder to the junction of said heating element and electrodes, and employing the heat of an electric current passed through said heating element to melt the solder.

4. The process of manufacture of thermocouple elements which consists of piercing a heating element, passing a pair of thermocouple electrodes therethrough, applying a flux and a solder to the junction of said heating element and electrodes, employing the heat of an electric current passed through said heating element to melt said solder, regulating the amount of said current to control the amount of solder so melted, and clipping off the unnecessary ends of said electrodes.

RUDOLPH H. STEIN.